United States Patent
Maruyama et al.

(10) Patent No.: US 8,305,038 B2
(45) Date of Patent: Nov. 6, 2012

(54) CHARGING APPARATUS AND CHARGING METHOD

(75) Inventors: Tomomi Maruyama, Konosu (JP); Eiji Saiki, Konosu (JP); Akitoshi Kato, Kawasaki (JP); Yoshihiro Honda, Tokorozawa (JP)

(73) Assignees: Iwasaki Electric Co., Ltd., Tokyo (JP); Tokyo Rectifier Co., Ltd., Kawasaki-Shi (JP); JPS Co. Ltd., Tokorozawa-Shi (JP)

( * ) Notice: Subject to any disclaimer, the term of this patent is extended or adjusted under 35 U.S.C. 154(b) by 315 days.

(21) Appl. No.: 12/918,974

(22) PCT Filed: Feb. 16, 2009

(86) PCT No.: PCT/JP2009/000595
§ 371 (c)(1),
(2), (4) Date: Aug. 23, 2010

(87) PCT Pub. No.: WO2009/107336
PCT Pub. Date: Sep. 3, 2009

(65) Prior Publication Data
US 2011/0169453 A1    Jul. 14, 2011

(30) Foreign Application Priority Data
Feb. 25, 2008 (JP) ................ 2008-043468

(51) Int. Cl.
*H02J 7/00* (2006.01)
(52) U.S. Cl. ......... 320/118; 320/125; 320/134; 320/160
(58) Field of Classification Search ............. 320/118
See application file for complete search history.

(56) References Cited

U.S. PATENT DOCUMENTS

| | | | | |
|---|---|---|---|---|
| 4,371,825 A | * | 2/1983 | Chi et al. | 320/118 |
| 5,475,294 A | * | 12/1995 | Isoda | 320/131 |
| 5,900,720 A | * | 5/1999 | Kallman et al. | 320/167 |
| 6,028,415 A | * | 2/2000 | Nagai et al. | 320/162 |
| 6,040,685 A | * | 3/2000 | Tsenter et al. | 320/160 |
| 6,104,165 A | * | 8/2000 | Miyamoto et al. | 320/125 |
| 7,902,796 B2 | * | 3/2011 | Ng | 320/160 |
| 2003/0141843 A1 | * | 7/2003 | Anzawa et al. | 320/118 |
| 2004/0135545 A1 | * | 7/2004 | Fowler et al. | 320/118 |
| 2005/0062456 A1 | * | 3/2005 | Stone et al. | 320/116 |
| 2006/0097698 A1 | * | 5/2006 | Plett | 320/118 |
| 2006/0103351 A1 | * | 5/2006 | Tanigawa et al. | 320/118 |
| 2006/0238165 A1 | * | 10/2006 | Moore et al. | 320/118 |
| 2009/0072790 A1 | * | 3/2009 | Ibrahim | 320/134 |

FOREIGN PATENT DOCUMENTS

| | | |
|---|---|---|
| JP | 2-33556 | 3/1990 |
| JP | 05-172914 | 7/1993 |
| JP | 7-79504 | 3/1995 |
| JP | 07-264780 | 10/1995 |
| JP | 11-329510 | 11/1999 |
| JP | 2003-087991 | 3/2003 |
| JP | 2008-010295 | 1/2008 |

* cited by examiner

*Primary Examiner* — Arun Williams
(74) *Attorney, Agent, or Firm* — Leason Ellis LLP (57) ABSTRACT

The present invention aims to reliably prevent overcharge by carrying out charging in just proportion during charging periods.

A charging apparatus 1 for charging a secondary cell 22 by supplying a charging current Ic thereto is provided with a discharge amount detector 62 for detecting an amount of power discharged from the secondary cell in a non-charging state, a charge amount detector 60 for detecting an amount of power charged into the secondary cell in a charging state, and a charger controller 10 for stopping charging when the amount of charged power (charge amount Wc) becomes equal to the amount of discharged power (discharge amount Wc) during a charging period.

4 Claims, 4 Drawing Sheets

FIG. 1

CHARGING APPARATUS AND CHARGING METHOD

CROSS-REFERENCE TO PRIOR APPLICATION

This is a U.S. National Phase application under 35 U.S.C. §371 of International Application No. PCT/JP2009/000595, filed Feb. 16, 2009, which claims the benefit of Japanese Patent Application No. 2008-043468, filed Feb. 25, 2008, both of which are incorporated herein by reference. The International Application was published in Japanese on Sep. 3, 2009 as WO/2009/107336 A1 under PCT Article 21 (2).

TECHNICAL FIELD

The present invention relates to a charging apparatus and a charging method and particularly to a technique for charging secondary cells in just proportion.

BACKGROUND ART

There have been conventionally known charging apparatuses for charging a secondary cell.

For charging apparatuses of this type, a so-called multi-stage constant current charging method has been proposed which reduces influence of internal resistance of a secondary cell and enables charging up to a state closer to full charge by charging the secondary cell with a specified constant current until a voltage thereof reaches a specified voltage and, thereafter, charging it with a current having a smaller value (for example, see Patent Document 1).

Further, a charging apparatus normally stops charging, assuming that full charge is reached such as when a cell voltage of a secondary cell reaches a specified value, when a charging current reaches a specified current value and when a specified time elapsed after the voltage of the secondary cell reached a specified voltage.

SUMMARY OF INVENTION

Technical Problem

However, a capacity of the secondary cell cannot be directly grasped from the cell voltage of the secondary cell and the charging current and it is impossible to realize charging in just proportion. Particularly, since charging is not stopped based on the capacity of the secondary cell under the conventional technology, a control and a circuit for preventing overcharge of a secondary cell are required.

The present invention has been implemented in view of the above situation and an object thereof is to provide a charging apparatus and a charging method capable of reliably preventing overcharge by carrying out charging in just proportion.

Solution To Problem

In order to accomplish the above object, the present invention is directed to a charging apparatus for charging a secondary cell by supplying a charging current thereto, comprising a discharge amount detection means for detecting an amount of power discharged from the secondary cell in a non-charging state; a charge amount detection means for detecting an amount of power charged into the secondary cell in a charging state; and a charging control means for stopping charging when the amount of charged power becomes equal to the amount of discharged power during a charging period.

Further, in order to accomplish the above object, the present invention is directed to a charging apparatus for charging a cell group, in which a plurality of secondary cells are connected in series, by supplying a charging current to the cell group, comprising an overcharge protection circuit including discharge route circuits provided to each of the secondary cells and adapted to cause the secondary cells being charged to discharge by Connecting the secondary cells to the discharge route circuits based on cell voltages of the secondary cells or to stop discharging by cutting off the secondary cells from the discharge route circuits; and a charging control means for continuing charging while reducing the charging current until the discharge of the secondary cell having started discharging to the discharge route circuit is stopped when the discharge of any one of the secondary cells to the discharge route circuit is started, wherein the charging control means stops charging when an amount of power charged into the cell group becomes equal to an amount of power discharged from the cell group in a non-charging state.

Furthermore, in order to accomplish the above object, the present invention is directed to a charging apparatus for charging a cell group, in which a plurality of secondary cells are connected in series, by supplying a charging current to the cell group, comprising a gas generation detection means for detecting gas generation from any one of the secondary cells while the cell group is being charged; and a charging control means for continuing charging while reducing the charging current until the gas generation is stopped when the gas generation is detected, wherein the charging control means stops charging when an amount of power charged into the cell group becomes equal to an amount of power discharged from the cell group in a non-charging state.

Anyone of the above charging apparatuses of the present invention further comprises an output means for outputting a measure of replacement time of the secondary cell based on a count value of the number of times the secondary cell is charged and a total number of possible charging which specifies the life of the secondary cell.

Further, in order to accomplish the above object, the present invention is directed to a charging method for charging a secondary cell by supplying a charging current thereto, comprising the steps of detecting an amount of power discharged from the secondary cell in a non-charging state; and stopping charging when an amount of power charged into the secondary cell becomes equal to the amount of discharged power during a charging period.

Advantageous Effects of Invention

According to the present invention, since charging is stopped when the amount of charged power and the amount of discharged power becomes equal during the charging period, charging can be carried out in just proportion and, particularly, overcharge can be reliably prevented since there is no likelihood of charging beyond a discharge amount.

REFERENCE SIGNS LIST 1, 100 charging apparatus 2 battery unit 4 charger unit
8 charger
10 charger controller (charging control means)
12 current detector
14 display
22, 22A, 22B, 122 secondary cell
24 cell group
26 overcharge protection circuit
34 discharge route circuit
38 cell controller
40 discharge resistor
42 switching element
44 overcharge protection detector
48 discharge cut-off detector
50 gas generation detector
60 charge amount calculator
62 discharge amount calculator
64 storage
Ic charging current
Ith lower limit charging current value
Vb battery voltage
Vth1 overcharge protection voltage
Vth2 protection stop voltage

DESCRIPTION OF EMBODIMENTS

Hereinafter, embodiments of the present invention are described with reference to the drawings.

First Embodiment

Figure 1:
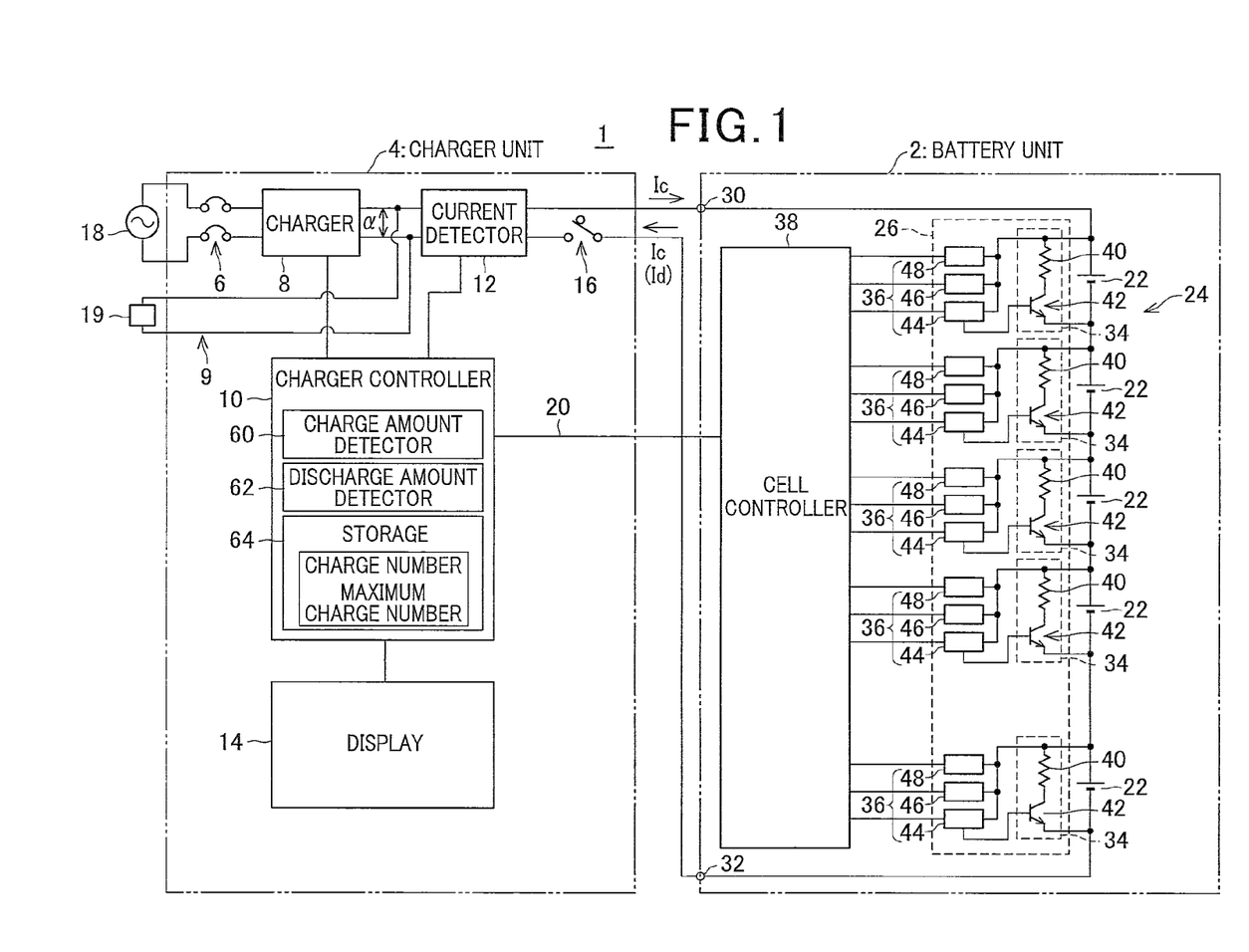
FIG. 1 is a diagram showing the construction of a charging apparatus according to a first embodiment of the present invention.

FIG. 1 is a diagram showing the construction of a charging apparatus 1 according to this embodiment. As shown in FIG. 1, the charging apparatus 1 is provided with a battery unit 2 for storing power and a charger unit 4 for charging the battery unit 2 by supplying power thereto.

The charger unit 4 includes an external power connector 6, a charger 8, a charger controller 10, a current detector 12, a display 14 and a cut-off switch 16.

The external power connector 6 is a connector connected to an external power supply 18 such as a commercial power supply, and power of the external power supply 18 is input to the charger 8.

The charger 8 charges the battery unit 2 and drives an external load 19 by supplying the power of the external power supply 18 to the battery unit 2 and the external load 19. This external load 19 is a device which receives the supply of stored power of the battery unit 2 during the power stoppage of the external power supply 18.

More specifically, the battery unit 2 and the external load 19 are connected in parallel to the charger 8, and a parallel circuit 9 is formed by these battery unit 2 and external load 19. The charger 8 supplies a DC charging current Ic to the battery unit 2 and supplies power to the external load 19 by applying a voltage α to this parallel circuit 9.

When the power stoppage of the external power supply 18 occurs, the charger 8 enters a high-impedance state when viewed from the parallel circuit 9 composed of the battery unit 2 and the external load 19, wherefore the battery unit 2 and the external load 19 are automatically connected in series and stored power is supplied from the battery unit 2 to the external load 19.

The charger controller 10 variably controls a current value of the charging current Ic during charging and is connected to the battery unit 2 via a signal line 20. The charger controller 10 controls the charging current Ic based on a signal received from the battery unit 2 via this signal line 20.

The current detector 12 is disposed in a series circuit connecting the charger 8 and the battery unit 2, detects the charging current Ic flowing from the battery unit 2 toward the charger 8 and a discharging current Id flowing from the charger 8 according to discharge and outputs to the charger controller 10.

The charger controller 10 variably controls the current value of the charging current Ic based on a detection signal of the current detector 12.

The charger controller 10 includes a charge amount detector 60 for taking and sampling the detection signal of the current detector 12 at intervals of a preset time and adding the sampled charging currents Ic to calculate and detect a charge amount Wc during charging periods, a discharge amount detector 62 for adding the sampled discharging currents Id to calculate and detect a discharge amount Wd during discharging periods, and a storage 64 for storing a charge number counted every time charging is carried out. This storage 64 further stores a maximum charge number to be described later which is a total number of possible charging and specifies the life of the cell group 24.

The charger controller 10 calculates a present storage amount W of the battery unit 2 based on the charge amount Wc and the discharge amount Wd detected by the charge amount detector 60 and the discharge amount detector 62. In other words, if an initial capacity W0 denotes a capacity in a state where the battery unit 2 is fully charged, the present storage amount W is calculated by $W=W0-Wd+Wc$.

Further, the charger controller 10 calculates a ratio of a present charge number to the maximum charge number as a measure of replacement time of the cell group 24.

The display 14 displays various pieces of information, for example, a calculated value of the present storage amount W of the battery unit 2 and the ratio of the present charge number to the maximum charge number under the control of the charger controller 10. By the display of this ratio, how far the life of the cell group 24 has been consumed up to the present can be grasped and time for replacement can be estimated.

The cut-off switch 16 is a constantly closed switch for stopping the discharge of the battery unit 2, disposed in the series circuit connecting the charger 8 and the battery unit 2, and opened to prevent overdischarge of the battery unit 2 when the battery unit 2 supplies power to the external load 19 under the control of the charger controller 10. In this way, discharge accompanying power supply from the battery unit 2 to the external load 19 or the like is stopped to prevent overdischarge.

Since the cut-off switch 16 is the constantly closed switch, an electrically conductive state is normally maintained in between the battery unit 2 and the external load 19. Since the electrically conductive state is constantly kept in between the battery unit 2 and the external load 19 without being cut off by a switch or the like, even if the power stoppage of the external power supply 18 occurs, a situation is prevented in which this switch is not activated due to stopped power supply and the battery unit 2 and the external load 19 are left cut off.

However, if the electrically conductive state is constantly maintained in between the battery unit 2 and the external load 19, the stored power of the battery unit 2 is supplied to the external load 19 while the battery unit 2 is not being charged. Accordingly, the charging apparatus 1 prevents power from being supplied from the battery unit 2 to the external load 19 and unnecessarily discharged by carrying out zero current charging for maintaining the charging current Ic flowing into the battery unit 2 substantially at zero during non-charging periods.

Specifically, during non-charging periods, the charger controller 10 feedback controls the voltage α applied to the parallel circuit 9 based on a detection value of the current detector 12 so that the charging current Ic flowing into the battery unit 2 is maintained substantially at zero. As a result, the voltage α and the voltage of the battery unit 2 become substantially equal to substantially zero a voltage difference, the charging current Ic to the battery unit 2 becomes substantially zero, and this state is held to hold the supply of the stored power from the battery unit 2 to the external load 19 in a stopped state.

Next, the construction of the battery unit 2 is described in detail.

The battery unit 2 includes the cell group 24 composed of n (n≧2) secondary cells 22 connected in series, and an overcharge protection circuit (balancing circuit) 26. The secondary cells 22 are, for example, lithium polymer cells as an example of lithium ion cells. Besides, it is possible to use arbitrary secondary cells such as nickel hydrogen cells and nickel cadmium cells. However, all the secondary cells 22 constituting the cell group 24 are secondary cells of the same type.

The battery unit 2 includes an anode terminal 30 electrically connected to an anode of the cell group 24 and a cathode terminal 32 electrically connected to a cathode of the cell group 24, and these anode terminal 30 and cathode terminal 32 are electrically connected to the charger unit 4. During charging periods, the charging current Ic is supplied from the charger unit 4 to the cell group 24 via the anode terminal 30 to charge the cell group 24.

The overcharge protection circuit 26 protects overcharge of the secondary cells 22 by aligning voltage balances among the secondary cells 22 and includes discharge route circuits 34 provided in parallel to the respective secondary cells 22, detector groups 36 provided to the respective secondary cells 22 and a cell controller 38.

Each discharge route circuit 34 is a circuit connecting a discharge resistor (balancing resistor) 40 and a switching element 42 in series in its path. The switching element 42 is a constantly open contact and closed when a cell voltage Vb of the secondary cell 22 reaches an overcharge protection voltage Vth1. This overcharge protection voltage Vth1 is set to be lower than a full charge voltage Vm according to the type of the secondary cell 22 and does not exceed 4.2 V at which a fully charged state is, for example, assumed in the case of a lithium polymer cell.

When the switching element 42 is closed, the discharge route circuit 34 is electrically connected to the secondary cell 22 that starts discharging to the discharge route circuit 34. During discharge to the discharge route circuit 34, the cell voltage Vb of the secondary cell 22 gradually decreases due to energy release by discharge, a reduction in flowing amount of the charging current Ic into the secondary cell 22 because of bypass of the charging current Ic to the discharge route circuit 34 or the like. When the cell voltage Vb decreases to a protection stop voltage Vth2 lower than the overcharge protection voltage Vth1 by a specified margin, the switching element 42 is opened to stop discharge to the discharge route circuit 34. During charging periods, transition is made to a charging state again. A difference between the overcharge protection voltage Vth1 and the protection end voltage Vth2 is set at such a value as to be able to prevent at least chattering of the switching element 42.

During discharge of the secondary cell 22, the charging current Ic flowing into this secondary cell 22 is bypassed to the discharge route circuit 34 to be introduced to the secondary cell 22 at a later stage. At this time, a value of the bypassed current is determined by a resistance value of the discharge resistor 40.

A detector group 36 includes an overcharge protection detector 44, an upper limit voltage detector 46 and a discharge cut-off detector 48. These overcharge protection detector 44, upper limit voltage detector 46 and discharge cut-off detector 48 form a comparator circuit comparing the cell voltage Vb of the secondary cell 22 with a specified voltage set for each secondary cell 22.

The overcharge protection detector 44 detects the cell voltage Vb of the secondary cell 22, compares this cell voltage Vb and the above overcharge protection voltage Vth1 and causes the secondary cell 22 to discharge to the discharge route circuit 34 by closing the switching element 42 when the cell voltage Vb exceeds the overcharge protection voltage Vth1. The overcharge protection detector 44 also stops discharge of the secondary cell 22 to the discharge route circuit 34 by opening the switching element 42 when the cell voltage Vb falls below the protection end voltage Vth2.

Further, the overcharge protection detector 44 outputs to the cell controller 38 an open/close signal indicating a closed/closed state of the switching element 42, i.e. start/stop of discharge every time the switching element 42 is opened or closed. Upon receiving such an open/close signal, the cell controller 38 outputs the open/close signal to the charger controller 10 of the charger unit 4 via the signal line 20, whereby the charger controller 10 can detect the presence or absence of discharge to the discharge route circuit 34.

The charger controller 10 performs such a control as to reduce the charging current Ic until discharge to the discharge route circuit 34 is stopped when detecting based on the open/close signal during a charging period that any one of the secondary cells 22 starts discharge to the discharge route circuit 34. Such a control is described later.

The upper limit voltage detector 46 detects the cell voltage Vb of the secondary cell 22 and outputs a detection signal to the cell controller 38 when the cell voltage Vb of the secondary cell 22 reaches an upper limit voltage Vth3 as an upper limit value of permissible voltages. The cell controller 38 outputs such a detection signal to the charger controller 10 via the signal line 20. The charger controller 10 quickly stops charging of the battery unit 2 when detecting based on the detection signal from the upper limit voltage detector 46 that the cell voltage Vb of anyone of the secondary cells 22 reached the upper limit value of permissible voltages.

The discharge cut-off detector 48 detects the cell voltage Vb of the secondary cell 22 and compares this cell voltage Vb and a discharge cut-off voltage Vth4 while the cell group 24 is not being charged, i.e. while the power of the cell group 24 is supplied to the external load 19, and outputs a detection signal to the cell controller 38 when the cell voltage Vb falls below the discharge cut-off voltage Vth4. The discharge cut-off voltage Vth4 is designed to prevent the secondary cell 22 from entering a state where the secondary cell 22 discharges beyond an end voltage, i.e. an overdischarge state and set at a voltage above the end voltage. For example, if the secondary cell 22 is a lithium polymer cell, the discharge cut-off voltage Vth4 is set at about 3 V.

The cell controller 38 outputs a cut-off signal, which indicates that discharge should be cut off, to the charger controller 10 via the signal line 20 when receiving the detection signal from any one of the discharge cut-off detectors 48. The charger controller 10 opens the cut-off switch 16 when receiving the cut-off signal from the cell controller 38. In this way, discharge caused by power supply from the battery unit 2 to the external load 19 or the like is stopped.

Note that this charging apparatus 1 includes a temperature detection sensor such as a thermistor for detecting a cell temperature of the cell group 24 and stops charging when the temperature of the cell group 24 exceeds a specified temperature (e.g. 60° C. in lithium polymer cells) during charging periods.

Next, a charging control of the charging apparatus 1 is described.

Figure 2:
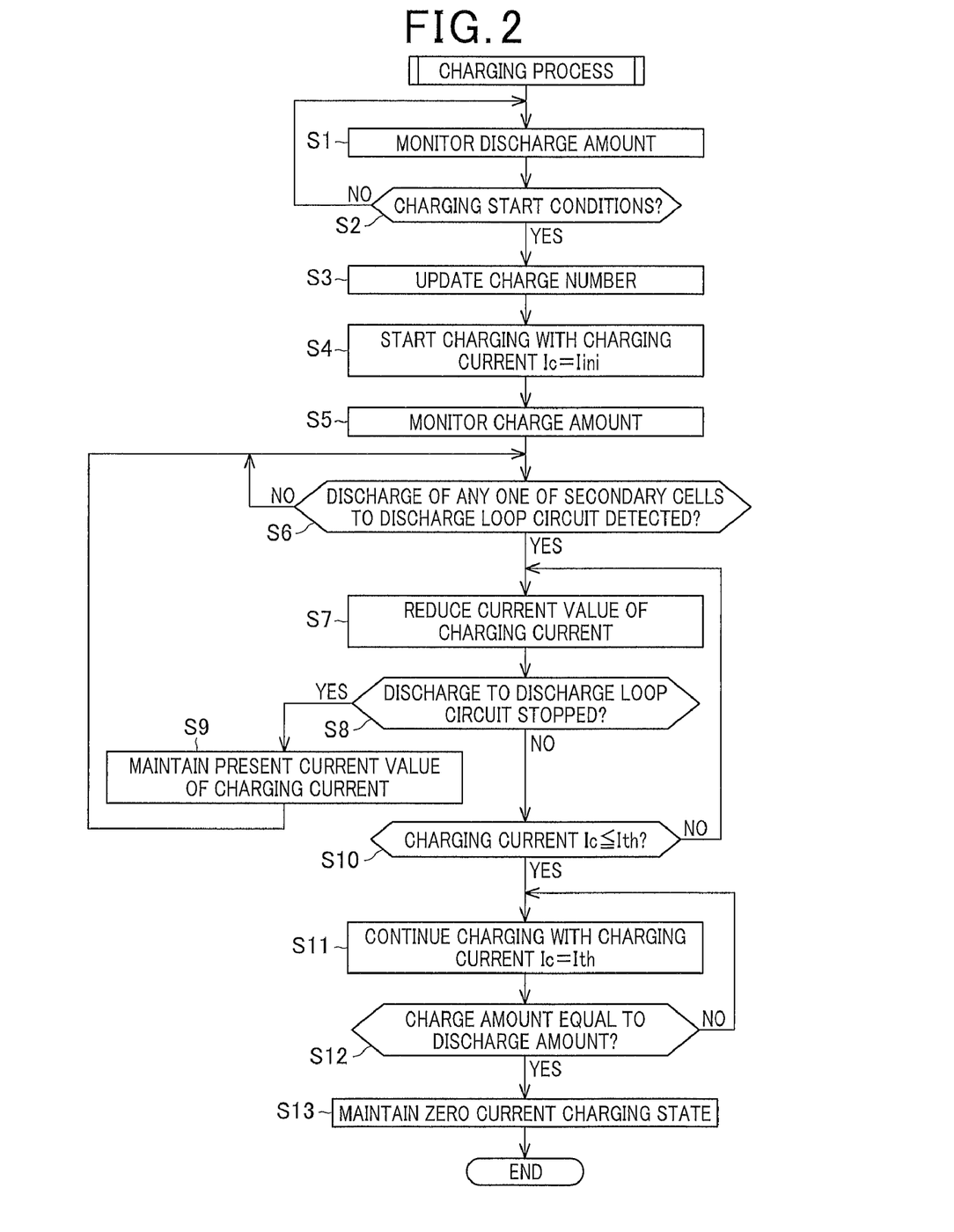
FIG. 2 is a flow chart of a charging process.
Figure 3:
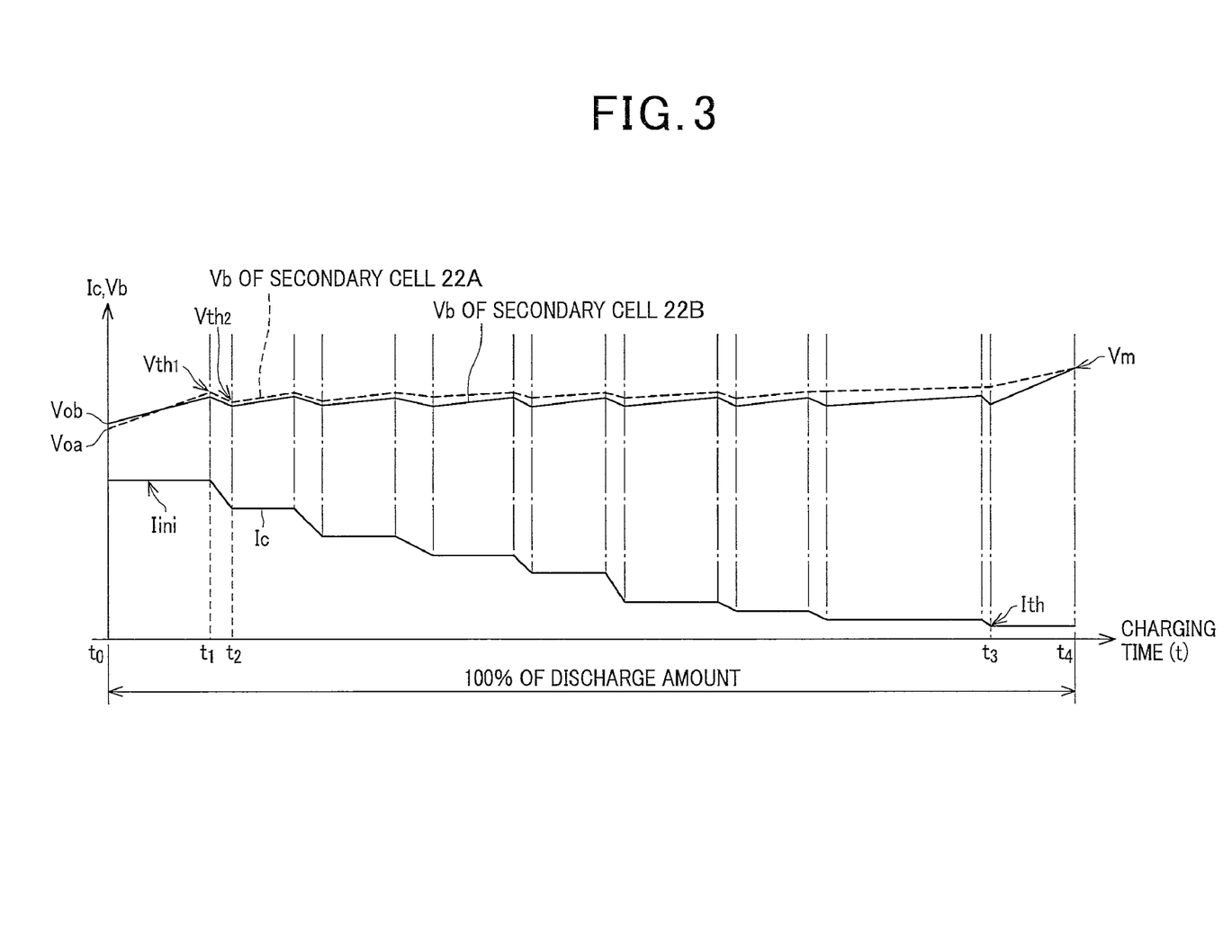
FIG. 3 is a chart showing charging patterns.

FIG. 2 is a flow chart showing a charging process of the charging apparatus 1, and FIG. 3 is a chart showing charging patterns by the charging apparatus 1. Note that FIG. 3 shows charging patterns of two secondary cells 22A, 22B having different cell voltage rising characteristics during charging periods.

The charging apparatus 1 monitors the discharge amount Wd during non-charging periods by continuously detecting the discharge amount Wd by the discharge amount detector 62 (Step S1). When charging start conditions are satisfied (Step S2: YES), when charging start conditions are satisfied (Step S1: YES), after the charge number is counted up to be updated (Step S3), the charging current Ic having a current value Iini is supplied to the battery unit 2 to start charging (Step S4). Then, the charging apparatus 1 monitors the charge amount Wc by continuously detecting the charge amount Wc by the charge amount detector 60 during charging periods (Step S5).

Various conditions, for example, a condition that the cell group 24 is no longer in the fully charged state, a condition that the cut-off switch 16 is opened to prevent overcharge and a condition that a specified period has elapsed after the completion of the previous charging are set as the charging start conditions.

Upon starting the supply of the charging current Ic having the current value Iini, the charging apparatus 1 adjusts the voltage α applied to the cell group 24 so that the current value of the charging current Ic becomes the current value Iini while sampling the detection signal by the current detector 12.

As a result, as shown in FIG. 3, when the supply of the charging current Ic is started to start charging (time t0), the cell voltages Vb of the respective secondary cells 22A, 22B of the cell group 24 start rising from charge initial voltages V0a, V0b.

For example, if the secondary cell 22A has such a characteristic that the cell voltage Vb more easily rises than the secondary cell 22B, the cell voltage Vb of the secondary cell 22A reaches the overcharge protection voltage Vth1 (time t1) before the cell voltage Vb of the secondary cell 22B reaches the overcharge protection voltage Vth1. In this way, the overcharge protection detector 44 of the secondary cell 22A closes the switching element 42 to prevent the secondary cell 22A from being overcharged, thereby connecting the secondary cell 22A to the discharge route circuit 34 to start discharge. When the overcharge protection detector 44 closes the switching element 42, an open/close signal is output to the charge controller 10 and discharge of the secondary cell 22A to the discharge route circuit 34 is detected by the charge controller 10.

As shown in FIG. 2, when detecting discharge of any one of the secondary cells 22 to the discharge route circuit 34 (Step S6: YES), the charge controller 10 successively reduces the current value of the charging current Ic (Step S7).

In this way, as shown in FIG. 3, the current value of the charging current Ic is reduced from time t1 when the cell voltage Vb of the secondary cell 22A reaches the overcharge protection voltage Vth1.

The cell voltage Vb of the secondary cell 22A is gradually reduced according to discharge to the discharge route circuit 34 and a decrease of the charging current Ic and, when the cell voltage Vb falls to the protection end voltage Vth2 (time t2), the overcharge protection detector 44 of the secondary cell 22A opens the switching element 42 to stop discharge of the secondary cell 22A to the discharge route circuit 34. This stop of the discharge to the discharge route circuit 34 is detected by the charge controller 10 by the output of the open/close signal to the charge controller 10.

As shown in FIG. 2, when detecting the stop of the discharge of the secondary cell 22 to the discharge route circuit 34 (Step S8: YES), the charge controller 10 stops reducing the current value of the charging current Ic and fixes the current value at a present value (Step S9) and continues charging by returning a process procedure to Step S6.

In this way, as shown in FIG. 3, the charging current Ic is fixed at a current value reached when the charging current Ic decreases until the cell voltage Vb of the secondary cell 22A falls to the protection stop voltage Vth2 to stop the discharge. Note that not only the cell voltage Vb of the secondary cell 22A, but also that of the other secondary cell 22B are reduced as the charging current Ic is reduced.

Thereafter, a process of reducing the charging current Ic until the discharge of the secondary cell 22 to the discharge route circuit 34 is stopped is repeatedly performed every time the discharge of any one of the secondary cells 22 to the discharge route circuit 34 is detected. This repeat count changes according to a difference in the voltage rising characteristic during the charging, a degree of deterioration and the like of the secondary cells 22, and the process is not constantly repeated by a fixed number of times.

At a charge final stage where the respective secondary cells 22 approach the fully charged state, the charging current Ic decreases and falls below a lower limit charging current value Ith (time t3) when being reduced by the process of the above Step S4 as shown in FIG. 3. This lower limit charging current value Ith is set at a specified current value, which the respective secondary cells 22 indicate when approaching the fully charged state.

As shown in FIG. 2, when detecting that the charging current Ic fell to or below a lower limit charging current value Ith (Step S10: YES), the charge controller 10 continues charging while maintaining the charging current Ic at the lower limit charging current value Ith (Step S11).

As a result, the charged states of the respective secondary cells 22 approach the fully charged state, the cell voltages Vb exceed the overcharge protection voltage Vth1 and the discharge to the discharge route circuit 34 is started in many of the secondary cells 22. Since the charging current Ic is a very small value at this time, the values of the currents bypassed to the discharge route circuits 34 are also small and energy losses in the discharge resistors 40 are also small. Even into the secondary cell 22 discharging to the discharge route circuit 34, a small current, which was not bypassed to the discharge route circuit 34, out of the charging current Ic flows and the cell voltage Vb transitions to reach the full charge voltage Vm beyond the overcharge protection voltage Vth1 (time t4) as shown in FIG. 3.

Subsequently, if the charge amount Wc into the cell group becomes equal to the discharge amount Wd during a non-charging period before the start of charging in the charging apparatus 1 (Step S12: YES), it means that about 100% of the discharge amount Wd has been charged from the start of charging (time t0). Accordingly, the charging apparatus 1 sets the charging state of the battery unit 2 at the above zero current charging state to stop charging the battery unit 2 (Step S13), thereby ending the charging process. In this zero current charging, the voltage α of the charger 8 is feedback controlled so that the charging current Ic flowing into the battery unit 2 is maintained substantially at zero as described above. In this way, the charging of the battery unit 2 is stopped and the supply of the stored power from the battery unit 2 to the external load 19 is held in the stopped state while the battery unit 2 and the external load 19 are held in the electrically conductive state.

Although the process of Step S12 is performed after the charging current Ic reaches the lower limit charging current value Ith in this embodiment, the charging apparatus 1 may continuously monitor whether or not the charged amount Wc into the cell group 24 has become equal to the discharge amount Wd and quickly stop charging regardless of the current value of the charging current Ic when the charged amount Wc into the cell group 24 becomes equal to the discharge amount Wd.

As described above, according to this embodiment, charging of the cell group 24 is stopped when the charged amount We becomes equal to the discharge amount Wd during the charging period. Thus, charging can be carried out in just proportion and, particularly, overcharge can be reliably prevented since there is no likelihood of charging beyond the discharge amount Wd.

Further, according to this embodiment, the charger controller 10 continues charging while reducing the charging current Ic until the discharge of the secondary cell 22 having started discharge to the discharge route circuit 34 is stopped when any one of the secondary cells 22 starts discharging to the discharge route circuit 34 by an overcharge protection operation of the overcharge protection circuit 26.

By this construction, the discharges of the respective secondary cells 22 to the discharge route circuits 34 are suppressed during charging, wherefore charging power is not wasted by discharge and charging efficiency is improved.

In addition, since heat generation in the discharge route circuits 34 is also reduced, deterioration of peripheral components is also prevented.

As described above, according to this embodiment, since charging efficiency is greatly improved, a fully charged state can be set by equalizing the charge amount Wc to the discharge amount Wd.

If charging efficiency of 100% cannot be attained due to a loss through discharge in the overcharge protection circuit 26 or the like, a correction may be made to add a loss to the discharge amount Wd so that the charge amount Wc compensating for this loss can be obtained and then charging may be carried out until the charge amount Wc becomes equal to the discharge amount Wd after this correction. Further, if charging efficiency decreases according to the deterioration of the cell group 24, the discharge amount Wd may be corrected in accordance with a decrease in charging efficiency due to aged deterioration so that charging is carried out to compensate for this decrease.

Further, according to this embodiment, the charger controller 10 continues the supply to the cell group 24 with the charging current Ic maintained at the specified lower limit charging current value Ith when the charging current Ic falls below this lower limit charging current value Ith, and stops charging when the charge amount Wc becomes equal to the discharge amount Wd.

By this construction, the supply to the cell group 24 is continued with the charging current Ic maintained at the lower limit charging current value Ith, whereby the cell voltages Vb of many of the secondary cells 22 exceed the overcharge protection voltage Vth1 to start discharging to the discharge route circuits 34. However, since the charging current Ic has the relatively small lower limit charging current value Ith, energy consumed by the discharge route circuits 34 is also suppressed to a low level. The respective secondary cells 22 can be charged up to the fully charged state with an energy amount consumed by the discharge route circuits 34 suppressed in this way.

Further, according to a charging method of this embodiment, the charging current Ic is steplessly reduced in conformity with charging characteristics of the respective secondary cells 22. Thus, as compared with a conventional charging method for reducing a charging current at multiple stages by a specified current value, it is difficult to predict a time required to reach a fully charged state. Therefore, a precise fully charged state cannot be obtained if charging is ended based on counted time.

Contrary to this, according to this embodiment, since charging of the cell group 24 is stopped when the charge amount We becomes equal to the discharge amount Wd, charging can be quickly stopped when the fully charged state is obtained.

Further, according to this embodiment, the charger controller 10 cuts off the supply of stored power from the cell group 24 to an external device and starts charging of the cell group 24 when the cell voltage Vb of any one of the secondary cells 22 falls to the specified discharge cut-off voltage Vth4 during a non-charging period, wherefore overcharge of each secondary cell 22 can be reliably prevented.

Second Embodiment

Next, a second embodiment of the present invention is described.

Figure 4:
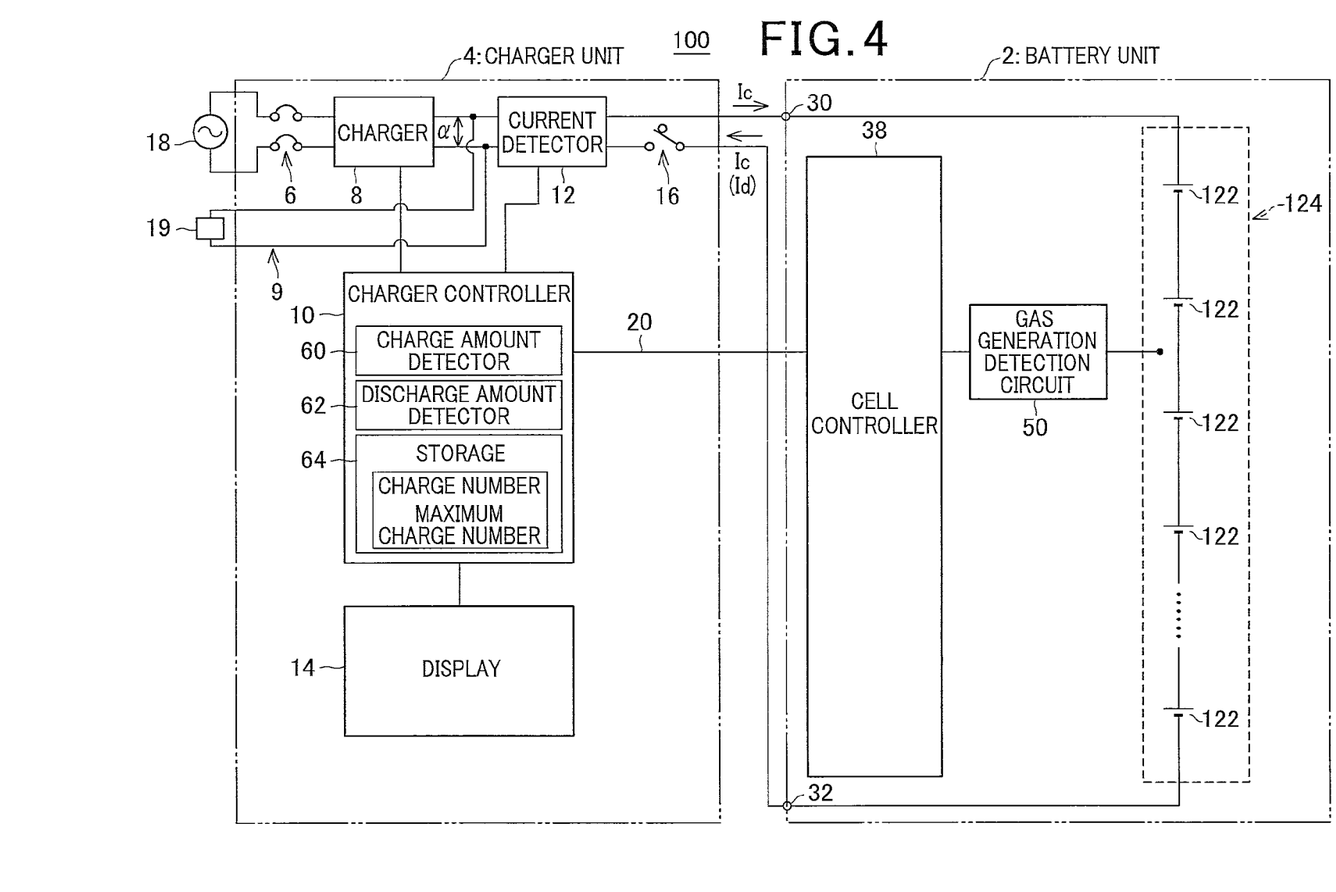
FIG. 4 is a diagram showing the construction of a charging apparatus according to a second embodiment.

In this embodiment is described a charging apparatus 100 for charging a cell group 124 in which a plurality of secondary cells 122 having a property of generating gas during charging are connected in series.

FIG. 4 is a diagram showing the construction of the charging apparatus 100 according to this embodiment. Note that the parts shown in FIG. 1 are denoted by the same reference numerals in FIG. 4 and not described.

As shown in FIG. 4, the charging apparatus 100 of this embodiment includes a gas generation detection circuit 50. This gas generation detection circuit 50 detects gas generation in any one of the secondary cells 122 during charging and outputs to a cell controller 38. The cell controller 38 outputs to a charger controller 10 via a signal line 20 in the case of detecting gas generation.

The charger controller 10 continues charging while reducing a charging current Ic until gas generation is stopped every time gas generation is detected during charging.

When the charging current Ic falls below the lower limit charging current value Ith, a process similar to that after Step S10 of FIG. 2 described in the first embodiment is performed. Namely, when detecting that the charging current Ic falls to or below the lower limit charging current value Ith (Step S10: YES), the charger controller 10 continues charging while maintaining the charging current Ic at the lower limit charging current value Ith (Step S11). When the charge amount Wc into the cell group 24 becomes equal to the discharge amount Wd during a non-charging period before the start of charging (Step S12: YES), the charger controller 10 stops charging while setting a charging state of the cell group 124 at a zero current charging state (Step S13), thereby ending the charging process.

As described above, according to this embodiment, charging of the cell group 24 is stopped when the charged amount Wc becomes equal to the discharge amount Wd during a charging period similar to the first embodiment. Thus, charging can be carried out in just proportion and, particularly, overcharge can be reliably prevented since there is no likelihood of charging beyond the discharge amount Wd.

Further, according to this embodiment, an increase in internal resistance of each secondary cell 122 is suppressed since gas generation in the secondary cell 122 is suppressed during charging. Thus, waste of charging power accompanying this increase in internal resistance is suppressed and charging efficiency is improved.

The gas generation detection circuit 50 may directly detect whether or not gas is being generated using a gas sensor or the like or may monitor the cell voltage Vb of each secondary cell 122 and indirectly detect gas generation by detecting that the cell voltage Vb has reached a specified voltage at which gas is generated from the secondary cell 122.

Further, if the gas generation detection circuit 50 directly detects whether or not gas is being generated using a sensor or the like, the charger controller 10 may judge the stop of the gas generation based on a detection result of this gas generation detection circuit 50 or may indirectly detect the stop of the gas generation by comparing a specified cell voltage at which gas generation is stopped and the cell voltage Vb of the secondary cell 122.

The above embodiments are to be understood as illustrative examples of the present invention and can be arbitrarily modified and applied within the scope of the present invention.

For example, overconsumption of charging power in the overcharge protection circuit 26 during charging and overconsumption of charging power accompanying gas generation in the secondary cells 122 during charging are suppressed in the above embodiments.

However, without being limited to this, if a cell group could cause a power consumption factor for unnecessarily consuming charging power other than for charging and this power consumption factor could be solved by reducing a charging current, the present invention can also be applied to charge such a cell group.

Namely, in the case of power consumption caused by the power consumption factor during charging, charging may be continued with the charging current reduced until this consumption is stopped.

The invention claimed is:

1. A charging apparatus for charging a cell group, in which a plurality of secondary cells are connected in series, by supplying a charging current to the cell group, comprising:
    a discharge amount detection means for detecting an amount of power discharged from the cell group in a non-charging state;
    a charge amount detection means for detecting an amount of power charged into the cell group in a charging state; and
    a charging control means for, during a charging period, charging while reducing the charging current every time a charging voltage of any one of the secondary cells exceeds a specified overcharge protection voltage set lower than a full charge voltage until the charging current is reduced to a lower limit charging current value indicating that the respective secondary cells of the cell group are close to a fully charged state, then continuing charging with a current value equal to or smaller than the lower limit charging current value to increase the charging voltages of the respective secondary cells above the overcharge protection voltage, and stopping charging when the amount of power charged into the cell group by the charging becomes equal to the amount of power discharged from the cell group in the non-charging state.

2. The charging apparatus according to claim 1, further comprising an overcharge protection circuit including discharge route circuits provided to each of the secondary cells and adapted to cause the secondary cell to discharge by connecting the secondary cell to the discharge route circuit when a cell voltage of the secondary cell being charged reaches the overcharge protection voltage and to stop discharging by cutting off the secondary cell from the discharge route circuit when the battery voltage falls below the overcharge protection voltage,
    wherein, during a charging period, the charging control means charges while reducing the charging current until discharge to the discharge route circuit is stopped every time discharge of any one of the secondary cells to the discharge route circuit is started while the charging current is being reduced to the lower limit charging current value, then continuing charging with a current value equal to or smaller than the lower limit charging current value to increase the charging voltages of the respective secondary cells above the overcharge protection voltage, and stopping charging when the amount of power charged into the cell group by the charging becomes equal to the amount of power discharged from the cell group in the non-charging state.

3. The charging apparatus according to claim 1 or 2, further comprising:
    an output means for outputting a measure of replacement time of the secondary cell based on a count value of the number of times the secondary cell is charged and a total number of possible charging which specifies the life of the secondary cell.

4. A charging method for charging a cell group, in which a plurality of secondary cells are connected in series, by supplying a charging current to the cell group, comprising the steps of:
    detecting amounts of power discharged from the secondary cells in a non-charging state; and
    during a charging period, charging while reducing the charging current every time a charging voltage of any one of the secondary cells exceeds a specified overcharge protection voltage set lower than a full charge voltage until the charging current is reduced to a lower limit charging current value indicating that the respective secondary cells of the cell group are close to a fully charged state, then continuing charging with a current value equal to or smaller than the lower limit charging current value to increase the charging voltages of the respective secondary cells above the overcharge protection voltage, and stopping charging when the amount of power charged into the cell group by the charging becomes equal to the amount of power discharged from the cell group in the non-charging state.

* * * * *